United States Patent [19]

Brunner et al.

[11] 4,290,136

[45] Sep. 15, 1981

[54] CIRCUIT ARRANGEMENT FOR MONITORING THE STATE OF SIGNAL SYSTEMS, PARTICULARLY TRAFFIC LIGHT SIGNAL SYSTEMS

[75] Inventors: Heinrich Brunner, Rottach-Egern; Peter Drebinger; Peter Hoehne, both of Munich; Johann Hoisl, Ottobrunn; Guenter Kochanowski, Wolfratshausen; Walter Wimmer, Pullach, all of Fed. Rep. of Germany

[73] Assignee: Siemens Aktiengesellschaft, Berlin & Munich, Fed. Rep. of Germany

[21] Appl. No.: 57,123

[22] Filed: Jul. 11, 1979

[30] Foreign Application Priority Data

Aug. 1, 1978 [DE] Fed. Rep. of Germany ....... 2833761

[51] Int. Cl.[3] ......................... G06F 11/00; B60Q 9/00

[52] U.S. Cl. ...................................................... 371/25

[58] Field of Search ....................... 371/25, 57, 60, 15; 340/46, 635, 653

[56] References Cited

U.S. PATENT DOCUMENTS 3,988,670 10/1976 Gariazzo .......................... 371/25 X 4,084,262 4/1978 Lloyd et al. ...................... 371/60 X

OTHER PUBLICATIONS

Obermaier, A., *Strassenverkehrstechnik*, No. 2, 1972, pp. 39–43.

*Primary Examiner*—Raulfe B. Zache

*Attorney, Agent, or Firm*—Hill, Van Santen, Steadman, Chiara & Simpson

[57] ABSTRACT

A circuit arrangement for monitoring the state of signal systems, particularly traffic light systems monitors different signal states as to the admissability or inadmissibility thereof in a simple manner without the necessity of carrying out manual wiring manipulations given a change of the signal conditions in adaptation to changed conditions or given an expansion of the signal system to be monitored. For this purpose, test signals which indicate test signal states are fixed in a memory and are processed with the signals indicating the respectively existing actual signal state of the signal transmitters in at least one microprocessor in such a manner that each signal indicating an actual state is compared with all test signals which are called up step-by-step in succession from the memory.

15 Claims, 1 Drawing Figure

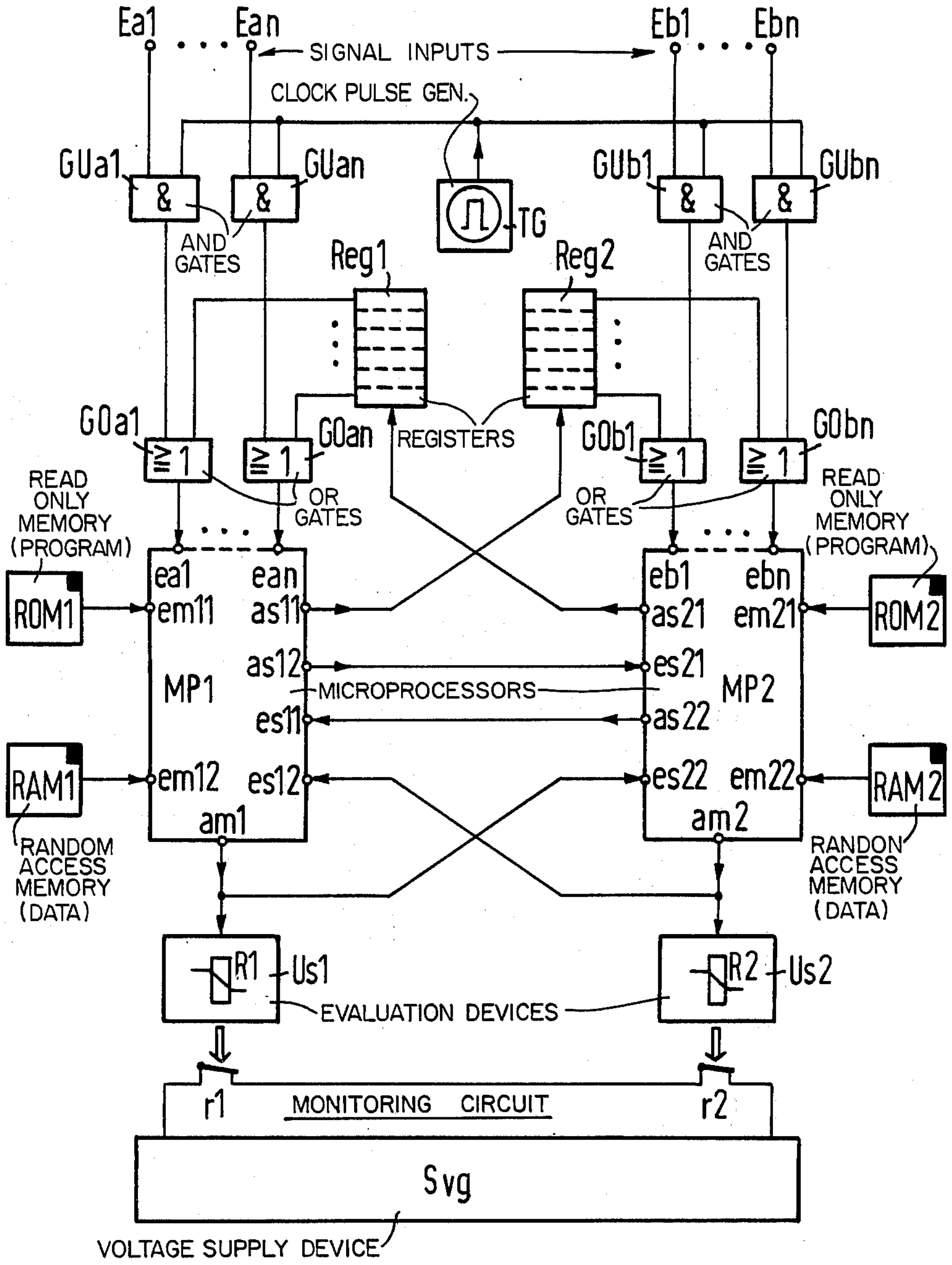
Ea1
Ean
SIGNAL INPUTS
Eb1
Ebn
CLOCK PULSE GEN.
GUa1
GUan
AND GATES
TG
GUb1
GUbn
Reg1
Reg2
GOa1
GOan
REGISTERS
GOb1
GObn
OR GATES
READ ONLY MEMORY (PROGRAM)
ROM1
ROM2
ea1
ean
eb1
ebn
em11
as11
as21
em21
MP1
as12
es21
MICROPROCESSORS
MP2
es11
as22
RAM1
RAM2
em12
es12
es22
em22
am1
am2
RANDOM ACCESS MEMORY (DATA)
RANDON ACCESS MEMORY (DATA)
R1
Us1
R2
Us2
EVALUATION DEVICES
r1
MONITORING CIRCUIT
r2
Svg
VOLTAGE SUPPLY DEVICE

CIRCUIT ARRANGEMENT FOR MONITORING THE STATE OF SIGNAL SYSTEMS, PARTICULARLY TRAFFIC LIGHT SIGNAL SYSTEMS

BACKGROUND OF THE INVENTION

1. Field of the Invention

The present invention relates to a circuit arrangement for monitoring the state of signal systems, particularly traffic light signal systems, with a comparator device which allows actual signal state respectively delivered by signal transmitters to be compared with the prescribed test signal states and with an evaluation device to which the clock pulse sequence is supplied only upon determination of allowable actual signal states and which indicates the presence of a disruption upon the determination of unallowable actual signal states.

2. Description of the Prior Art

A circuit arrangement of the type generally described above is already known in the art, for example from the periodical "Strassenverkehrstechnik", No. 2, 1972, pp. 39–43. In this known circuit arrangement, a comparator device is constructed of a plurality of logic circuits which are connected with the signal transmitters by fixed wiring. With the assistance of these permanently wired logic circuits, the signal states of the signal transmitters are then compared with so-called "hostile" signal images. If a coincidence of the actually existing signal states, i.e. the actual signal states of the signal transmitter concerned with such a predetermined signal image, then the signal state is evaluated in a corresponding signal safety device as an erroneous state. It is thereby disadvantageous that, as a result of the individual wiring corresponding to the conditions respectively existing, a rearrangement or, respectively, expansion of such a circuit arrangement to adapt to new or, respectively, changed conditions, can only be undertaken with great difficulty.

SUMMARY OF THE INVENTION

Accordingly, the object of the present invention is to provide a circuit arrangement of the type generally mentioned above, in which different signal states can be securely monitored as to their admissibility or inadmissibility in a simple manner without the necessity of undertaking manual wiring work in the circuit arrangement upon a change of the signal states in adaptation to changed conditions or upon an expansion of the signal system to be monitored.

According to the present invention, the above object is achieved, in a circuit arrangement of the type generally mentioned above, in that the test signals indicating the test signal states are stored in a memory and are processed along with the signals indicating the respectively existing actual signal states of the signal transmitters in at least one microprocessor in such a manner that each signal indicating an actual signal state is compared with all of the test signals successively called up step-by-step from the memory.

In comparison to the known circuit arrangement discussed above, the present invention provides the advantage that, given a change of the signal states of the signal systems to be monitored in adaptation to changed conditions, or as a result of an expansion, one can accomplish changes without the necessity of executing manual wiring changes in the circuit arrangement. To the contrary, it is sufficient to simply replace the memory provided with a different memory which contains the stored test signals for the respective case coming into consideration.

Advantageously, only the test signals indicating the inadmissible signal states of the signal transmitters are stored in the respective memory. By doing so, there is derived a particularly simple control possibility of the evaluation device. Moreover, in this manner, a positive determination of the existence of inadmissible actual signal states of the signal transmitter is rendered possible, which is precisely what is frequently desired for reasons of safety technology.

For covering the signals indicating the actual signal states, signal transmitters belonging to two separate groups of signal transmitters are advantageously provided, whereby a separate microprocessor is provided for processing the signals emitted from the signal transmitters of each group of signal transmitters. With this arrangement, a particularly sure coverage of the respectively existing actual signal states of the signal transmitters is made possible in an advantageous manner.

A further increase in the reliability of monitoring of the state of signal systems is provided when, given the advantageous measure discussed above, a separate memory for the reception of test signals indicating predetermined test signal states is permanently allocated to each microprocessor. In this case, in particular, the monitoring to be undertaken can still be carried out when the circuit part containing the one microprocessor is out of operation, so that it is unable to recognize inadmissible actual signal states.

Advantageously, the signal transmitters are connected on their output side with inputs of the respective microprocessor by way of pulse-controlled transmission elements. In this manner, there occurs the advantage of a relatively simple possibility for monitoring the transmission path between the signal transmitter and the microprocessors. The error free functioning of the transmission paths can be deduced from the occurrence of pulses on these transmission paths.

A particularly simple pulse control is produced when a conventional a.c. supply serves for the pulse control of the transmission elements, which supply also supplies the signal transmitters. In this case, no separate pulse control source for the pulse control of the transmission elements is necessary.

A particularly simple and secure monitoring of the transmission path is produced when the pulse pauses between the signal pulses transmitted in succession by the transmission elements or monitored as to their existence with the assistance of the respective microprocessor, in that during the occurrence of the signal pauses, in particular, specific potential relationships must prevail on the transmission paths coming into consideration, which potential relationships can be simply determined in the respective microprocessor.

During the interval of at least one such pulse pause, a separate test signal can be supplied to the respective microprocessor upon whose reception the microprocessor must emit a specific message signal. Thereby, the faultless operation of the respective microprocessor can also be monitored in an advantageous manner in the course of the secure monitoring of the signal state of the signal transmitters, all of which adds to an increase of the operational security of the entire circuit arrangement.

Advantageously, in the context just discussed, one proceeds in such a manner that, upon employment of two microprocessors, one allows each microprocessor to trigger the supply of a test signal to the other microprocessor and to undertake the evaluation of the message signal respectively emitted from the other microprocessor. By doing so, a mutual monitoring of the two microprocessors and a secure manner of operation of the entire circuit arrangement are assured in an advantageous manner.

Expediently, signal bit combinations are employed as test signals in which the respective microprocessor emits an output signal different from the clock pulse sequence emitted, given the existence of admissible actual signal states, which output signal can be evaluated by the other microprocessor without effecting the delivery of a message signal indicating the existence of a disruption of the appertaining evaluation circuit. This means that the respective test signal bit combinations are, to a certain extent, intentionally meant to indicate the existence of a disruption, which the respective microprocessor is also meant to recognize without, however, controlling the appertaining evaluation circuit in such a manner that the same triggers an alarm. Thereby, the feature concerned approaches the employment of traditional evaluation circuits having electromechanical switching elements which require a relatively long time span for triggering which lies in the magnitude of a few milliseconds, whereas the occurrence of the output signal of the respective microprocessor may, for example, issue within a few microseconds.

Advantageously, the respective test signal may be loaded subject to control by means of the respective microprocessor into a register which is respectively connected on the output side with those inputs of the respective other microprocessor to which the test signal is to be supplied. With this construction, a simple, controlled offering of the respective test signals is achieved in an advantageous manner.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which is a schematic logic representation of a monitoring system constructed in accordance with the present invention.

DESCRIPTION OF THE PREFERRED EMBODIMENTS

The circuit arrangement illustrated on the drawing serves for monitoring the state of a signal system in which it may, in particular, be a matter of a traffic light system. A plurality of signal transmitters, which in the present case do not emit only the actual signal characters, but also emit signals corresponding to their signal states, i.e. signal states, belonging to the signal system. Thereby, these signal states can either be emitted by the signal transmitter themselves, or by message elements connected to the signal transmitters. The message elements can either be a matter of voltage message elements or current message elements, which message elements are known per se and need not be explained in further detail herein.

The signal states emitted by the signal transmitters or, respectively, by the message elements allocated to the signal transmitter occur at the connections Ea1–Ean, as well as at the connections Eb1–Ebn. As can be seen on the drawing, in the present case two groups of corresponding connections are provided whereby signal states applied to connections corresponding with one another of both signal groups of connections, respective signal transmitters or, respectively, message elements allocated to the transmitters which correspond with one another. This means that a redundant comprehension of the signal states of the individual signal transmitters ensues. Thereby, each group of connections Ea1–Ean or, respectively, Eb1–Ebn, exhibits at least as many connections as they are signal transmitters or, respectively, message elements allocated to the transmitters within the signal system to be monitored.

In the present case, logic circuits GUa1–GUan, formed by means of AND gates, are connected to connections Ea1–Ean with one input each. In a corresponding manner, logic circuits GUb1–GUbn, also formed by means of AND gates, are connected to the connections Eb1–Ebn with one input each. All of the logic circuits GUa1–GUan and GUb1–GUbn have the other input thereof connected to the output of a clock pulse generator TG receiving clock pulses, which makes the logic circuits capable of transmission in a pulse-wise manner with the delivery of pulses. The processes connected therewith will be discussed further below.

The AND gates GUa1–GUan are respectively connected by their outputs via OR gates GOa1–GOan to the one input connection ea1–ean, respectively of a first microprocessor MP1. In a corresponding manner, the AND gates GUb1–GUbn are connected with their outputs by way of OR gates GOb1–GObn, respectively, to respective input connections eb1–ebn of a second microprocessor MP2. The two microprocessors MP1 and MP2 may be microprocessors which correspond entirely with one another, such as those of the type SAB8048 which are manufactured by Siemens AG.

The OR gates GOa1–GOan are connected on the input side to the outputs of stages of a first register Reg1, which may be constructed as a shift register. The shift register Reg1 is connected with a signal and shift input to an output as21 of the second microprocessor MP2. The OR gates GOb1–GObn, whose outputs are connected to the inputs eb1–ebn of the microprocessor MP2, are connected in a corresponding manner to the output register stages of a register Reg2, which likewise may be constructed as a shift register. The shift register Reg2 is connected with a signal and shift input to an output connection as11 of the microprocessor MP1.

A program memory and a data memory are allocated to each of the two microprocessors MP1 and MP2. Thus, the microprocessor MP1 is connected with an input connection em11 to a program memory ROM1 allocated thereto, which is a read only memory and which, if necessary, can be programmable. The microprocessor MP1 is connected with an input connection em12 with a data memory RAM1 allocated thereto, which likewise may be a permanent memory or a memory having random access and being secured as to power failure. The other microprocessor MP2 is connected in a corresponding manner by way of an input connection em21 with its allocated program memory ROM2 and by way of an input connection em22 with its allocated data memory RAM2. The same is true with respect to these two memories ROM2 and RAM2 as is true with regard to the memories allocated to the microprocessor MP1.

A separate evaluation device US1, or respectively, US2 is permanently allocated to each of the two microprocessors MP1 and MP2. The evaluation device US1 is connected on its input side to an output connection am1 of the microprocessor MP1. The evaluation device US2 is connected on its side to an output connection am2 of the microprocessor MP2. These two evaluation devices may respectively contain an electromechanical device, such as a relay R1 or, respectively a relay R2, which is excited by the respective microprocessor upon the existence of a message signal indicating a disruption state. However, as already indicated above, it is necessary that the respective message signal have a certain minimum duration for the excitation of the relay concerned.

The two evaluation devices US1 and US2, as schematically indicated on the drawing, control a monitoring circuit in which for example, a voltage supply device Svg for the aforementioned signal transmitter may be connected. As indicated on the drawing, the contact r1 or, respectively, r2 of the relay R1 and R2 of the two evaluation devices us1, us2 are connected in the monitoring circuit. Given the excitation of at least one of these two relays, the monitoring circuit is interrupted, whereupon the voltage supply device Svg can interrupt the voltage supply of the signal transmitters.

In addition to the circuit elements and connections discussed up to this point, between the circuit elements illustrated on the drawing, a number of further circuit connections exist between the two microprocessors MP1 and MP2. Therefore, the microprocessor MP1 is connected with an output connection as12 with an input connection es21 of the microprocessor MP2 which, in turn, is connected by way of an output connection as22 with an input connection es11 of the microprocessor MP1. Moreover, the microprocessor MP1 is connected with an input connection es12 to the output connection am2 of the microprocessor MP2 which, in turn, is connected with an input connection es22 to the output connection am1 of the microprocessor MP1. Control processes which will be described in detail below are carried out by way of these connections of the two microprocessors MP1 and MP2.

The manner of operation of the circuit arrangement illustrated on the drawing and discussed above will be dealt with below in greater detail. To this end, one must first proceed from the fact that signals characterizing respectively admissible actual signal states respectively occur at the connections Ea1–Ean, on the one hand, and at the connections Eb1–Ebn, on the other hand. These signals are compared in the respectively allocated microprocessors MP1 and MP2 with test signals indicating the test signal states which are respectively contained in the allocated data memories RAM1 or, respectively, RAM2. Thereby, the organization is undertaken in such a manner that each microprocessor compares the signal indicating the respective actual signal states supplied thereto at the input side with all test signals in succession which are called up out of its allocated data memory RAM1 or, respectively, RAM2. In the course of this step-by-step comparison, the respective microprocessor MP1 or, respectively, MP2 emits a clock pulse sequence from its output connections am1 or, respectively, am2, when the respective actual signal state is recognized as an admissible actual signal state. The respective clock pulse sequence is then supplied to the appertaining evaluation device Us1 or, respectively, Us2, which signals no disruption message upon the occurrence of such a clock pulse sequence.

Thereby, the comparison processes described above which the respective microprocessor carries out can be carried out between the signals indicating the actual signal states, on the one hand, and the test signals indicating the inadmissible states, or test signals indicating only admissible states, on the other hand. Thereby, the appertaining comparison processes can be carried out with the assistance of the arithmetic unit contained in the respective microprocessor. In consideration of the fact that the actual signal states change only in relatively large time intervals and in consideration of the fact that the plurality of the different test signal states will not, in general, be very high, each actual signal state is repeatedly compared with all test signal states with microprocessors which are presently available.

As explained above, the signals indicating the individual actual signal states of the signal transmitters are now not supplied as continuous signals to the corresponding input connections of the microprocessors, but rather the signals are supplied by way of the pulse control AND gates GUa1–GUan or, respectively, GUb1–GUbn. Accordingly, pulses characteristic for the respective actual signal states occur at the corresponding input connections of the two microprocessors. On the other hand, pulse gaps respectively occur between the pulses. The organization may be now undertaken in such a manner that microprocessors can also determine the presence of such pulse pauses and can deduce the existence of a faulty transmission path of the signals indicating the actual signal states from the non-occurrence of such pulse pauses. Thereby, these monitoring processes can be undertaken in conjunction with the comparison processes which can be carried out between the occurrence of two successive pulses of the pulses emitted by the AND gates. However, the monitoring of the pulse pauses under consideration presupposes that the potential present during the occurrence of these pulses is different from the potential that occurs upon the occurrence of the pulse. Since such a discrimination possibility normally is only given when pulses occur which are characteristic for the existence of actual signal states having signal levels, the monitoring just mentioned is advantageously limited to that case that actual signal states occur with such signal levels.

As already explained above, it is possible with the assistance of the circuit arrangement according to the present invention to supply a separate test signal to the respective microprocessor during the interval of at least one of the previously-mentioned pulse pauses. This occurs by way of the shift registers Reg1, Reg2. The shift register Reg1 is allocated to the microprocessor MP1 and the shift register Reg2 is allocated to the microprocessor MP2. The shift register Reg1 is charged proceeding from the microprocessor MP2 with the test signal bits forming the separate test signal, which test signal bits the microprocessor MP2 may emit from its output connection as21. The shift register Reg2 is charged in a corresponding manner with test signal bits from the output connection as11 of the microprocessor MP1. Thereby, the charge processes referred to need not be carried out simultaneously. On the contrary, it is sufficient when only one of the shift registers is charged with a test signal. In the present case, such a signal is employed as a test signal upon whose reception by the respective microprocessor the microprocessor must emit a very specific message signal. Therefore, an inadmissible actual signal state is simulated to a certain extent for the microprocessor under conditions with the respective test signal. Moreover, the delivery of a message signal also has as a result that the clock pulse sequence normally emitted at the output by the respective microprocessor is not emitted. However, the time relationships are thereby selected in such a manner that the evaluation device Us1 or, respectively, Us2 assigned to the respective microprocessor does not yet respond to the occurrence of the respective message signal. However, the respective message signal is accepted and evaluated by the other microprocessor, i.e. by that microprocessor which had previously triggered the delivery of the test signal. To this end, the output connections am1 or, respectively am2 of the two microprocessors are connected with the input connections es22 or, respectively, es12 of the other microprocessor. In the present case, it may be reported to the microprocessor MP2 by way of the connection between the output as12 of the microprocessor MP1 and the input connection es21 of the microprocessor MP2 a test signal is being supplied thereto at the input side. In a corresponding manner, it is reported to the microprocessor MP1, via the control line between the output connection as22 of the microprocessor MP2 and the input connection es11 of the microprocessor MP1 that a corresponding test signal is being supplied thereto at the input side. However, it is also possible that it is reported to the respectively controlled microprocessor, via the control lines concerned, that it is receiving an output signal to be evaluated supplied from the microprocessor (namely, at the input connection es12 of the microprocessor MP1 or, respectively, at the input connection es22 of the microprocessor MP2). Thereby, with the assistance of each of the two microprocessors, it can be monitored whether the respective other microprocessors generates the appropriate message signal in response to the test signal supplied thereto at the input side. If the occurrence of such a message signal is not determined, then the monitoring microprocessor can emit a corresponding disruption message and cause the response of the assigned evaluation device. By means of these monitoring measures, a particularly secure monitoring of the signal states is guaranteed for the signal indicators which emit the signal characteristic for their signal states to the connections Ea1–Ean or, respectively, Eb1–Ebn.

In the course of the above discussion of the manner of operation of the circuit arrangement illustrated on the drawing, it has been assumed that admissible actual signal states respectively exist at the signal transmitters. When, however, an inadmissible actual signal state occurs, the same is determined by means of each of the two microprocessors MP1 and MP2 provided in the course of carrying out the respective comparison processes. When only test signal states characteristic for the admissible actual signal states are stored in the data memory allocated to the respective microprocessor, then a non-coincidence between the actual existing signal state and all test signal states is determined in the course of the comparison processes under consideration. If, on the other hand, the test signals indicating inadmissible signal states of the signal transmitters are stored in the data memories allocated to the respective microprocessor, a coincidence between the existing actual signal state and one of the test signals is determined. In each case, the respective microprocessor emits a corresponding message signal to its assigned evaluation device which, since the message signal concerned occurs for a sufficient length of time, now responds and, therefore, reports the existence of a disruption. As already indicated above, in this case, the current supply device Svg of the signal transmitters can be turned off so that the signal transmitters then become dead. In this case, however, it is also possible to have the signal transmitters carry out a specific, predetermined emergency operation, for example, a flashing operation.

In conclusion, it should be pointed out that different manners of operation of the microprocessors MP1 and MP2 have been described above which the microprocessors execute sequentially. In order to be able to carry out these manners of operation, the microprocessors MP1, MP2 have the program memories ROM1 or, respectively, ROM2, already mentioned above, assigned thereto. The data controlling the implementation of the operating processes are stored in these program memories, which in the respective microprocessor calls up in succession with the assistance of the control counter contained therein in order to carry out corresponding control processes. Moreover, it should be pointed out that the pulse-wise control of the AND gate GUa1–GUan and GUb1–GUbn insues proceeding from the clock pulse generator TG in the clock pulse of a conventional commercial a.c. source which also supplies the signal transmitters. In the 50 Hertz mains lines, a.c. voltages often employed for feeding the signal transmitters (60 Hertz in the United States), and the pulses controlling the AND gates in a pulse-wise manner can occur in a time span of 20 ms or 10 ms, in particular, for example, at the zero passages of the commercial a.c. voltage.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A circuit arrangement for monitoring the state of a signal system, comprising:

a memory means storing a plurality of test signals corresponding to inadmissible signal states;

an evaluation means including an input and an output and operable in response to a predetermined clock pulse sequence at said input to provide an output signal indicating an inadmissible actual signal state; and signal comparison means including first inputs for receiving sequential actual state signals, second inputs connected to said memory means for receiving the test signals and an output connected to said evaluation means, and operable to sequentially compare each actual signal with all test signals and emit said predetermined clock pulse sequence in response to equality of an actual state signal and a test signal.

2. The circuit arrangement of claim 1, wherein said signal comparison means comprises:

a microprocessor connected to said memory means; and program means connected to and operable to control the operation of said microprocessor.

3. A circuit arrangement for monitoring the state of a signal system, comprising:

a memory means storing a plurality of test signals corresponding to admissible actual states;

an evaluation means including an input and an output and operable in response to a predetermined clock pulse sequence at said input to provide an output signal indicating an inadmissible actual signal state; and signal comparison means including first inputs for receiving sequential actual state signals, second inputs connected to said memory means for receiving the test signals and an output connected to said evaluation means, and operable to sequentially compare each actual signal with all test signals and emit said predetermined clock pulse sequence in response to inequality of an actual state signal and a test signal.

4. The circuit arrangement of claim 3, wherein said signal comparison means comprises:

a microprocessor connected to said memory means; and program means connected to and operable to control the operation of said microprocessor.

5. A circuit arrangement for monitoring the state of a signal system, comprising:

a memory means storing a plurality of test signals indicating test signal states, said memory means comprising first and second memories each storing a respective group of said test signals;

an evaluation means including an input and an output and operable in response to a predetermined clock pulse sequence at said input to provide an output signal indicating an inadmissible actual signal state, said evaluation means comprising first and second evaluation devices each including an input for receiving the predetermined clock pulse sequence and an output for indicating an inadmissible actual signal state; and signal comparison means including first inputs for receiving sequential actual state signals, second inputs connected to said memory means for receiving the test signals and an output connected to said evaluation means, and operable to sequentially compare each actual state signal with all test signals and emit said predetermined clock pulse sequence in response to a comparison indicating an inadmissible actual state, said signal comparison means comprising first and second microprocessors connected to receive respective groups of actual state signals from said first inputs and connected to respective ones of said memories for receiving respective groups of test signals, and first and second program means connected to respective microprocessors for programming said microprocessors to compare the actual and test signals, each of said microprocessors connected to the input of a respective evaluation device.

6. The circuit arrangement of claim 5, wherein said first inputs of said signal comparison means comprises:

a pulse generator for producing timing pulses; and a plurality of AND gates each including a signal input for receiving an actual state signal, a timing pulse input connected to said pulse generator, and an output connected to a respective input of the respective microprocessor.

7. The circuit arrangement of claim 6, wherein the signal system comprises signal transmitters fed by an electrical supply, and said evaluation devices each comprise:

means connected in circuit between the electrical supply and the signal transmitters and operable to condition the transmitters to a predetermined state.

8. The circuit arrangement of claim 7, wherein said pulse generator comprises:

means deriving the timing pulses from the electrical supply, the electrical supply being a conventional commercial a.c. supply.

9. The circuit arrangement of claim 8, wherein each of said microprocessors comprises:

means for monitoring the outputs of said gates during the pauses between pulses.

10. The circuit arrangement of claim 9, wherein each of said microprocessors comprises:

means for receiving a special test signal during a pulse pause and operable to provide a specific alarm signal.

11. The circuit arrangement of claim 10, wherein each of said microprocessors comprises:

a special test signal input; and a special test signal output connected to said special test signal input of the other microprocessor.

12. The circuit arrangement of claim 11, wherein said special test signal input comprises:

a plurality of OR gates each having a first input connected to the output of a respective AND gate, an output connected to a respective input of the respective microprocessor, and a second input connected to receive the special test signal from the other microprocessor.

13. The circuit arrangement of claim 12, comprising:

first and second registers each including a signal input connected to a respective microprocessor and a plurality of stages each connected to said second input of an OR gate which is connected to the other respective microprocessor, for evaluation of the special test signal in the other respective microprocessor, during the pulse pauses of the actual state signals.

14. The circuit arrangement of claim 13, wherein each of said program means comprises a read only memory.

15. The circuit arrangement of claim 13, wherein each of said first and second memories comprises a random access memory.

* * * * *